Patented Oct. 15, 1946

2,409,291

UNITED STATES PATENT OFFICE 2,409,291

CHEMOTHERAPEUTIC SULFANILAMIDE DERIVATIVES

William A. Lott, Maplewood, and Raymond Van Winkle, Highland Park, N. J., assignors to E. R. Squibb & Sons, New York, N. Y., a corporation of New York No Drawing. Application May 19, 1942, Serial No. 443,622

6 Claims. (Cl. 260—440)

This invention relates to, and has for its object the provision of: (A) compounds of the main general formula

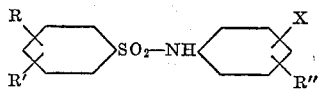

wherein X represents a member of the class consisting of —As=O, —As (halogen)$_2$, and

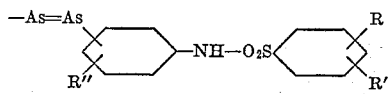

R represents a member of the class consisting of nitro, amino, (lower alkyl)-amino, and acylamino, R' represents a member of the class consisting of hydrogen, hydroxy, and alkoxy, and R'' represents a member of the class consisting of hydrogen and hydroxy; (B) salt-type derivatives of these compounds; and (C) methods of preparing compounds (A) and (B).

The invention comprises especially compounds of the main general formula wherein R is in the para position with respect to the —SO$_2$—, preferably wherein X is

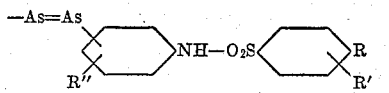

and salt-type derivatives thereof. Compounds of this preferred type wherein R is amino, and salt-type derivatives of such compounds, are valuable chemotherapeutic agents.

The method of preparing the compounds of this invention essentially comprises condensing a compound of the general formula

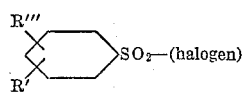

where R' has the above-given meaning and R''' represents a member of the class consisting of nitro, (lower-alkyl)-amino, and acyl-amino with a compound of the general formula

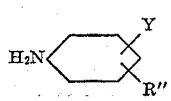

wherein R'' has the above-given meaning, and Y represents a member of the group consisting of —As=O, —As (halogen)$_2$, and

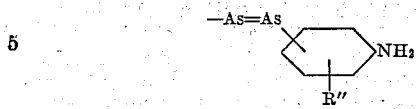

preferably in a pyridine-type reaction medium; alternatively, the compounds of the main general formula wherein X is

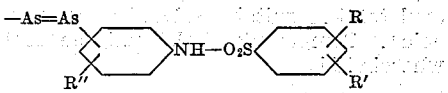

may be prepared by condensing a compound of the general formula

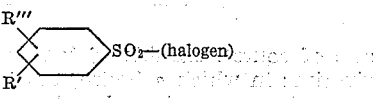

wherein R' and R''' have the above-given meanings, with a compound of the general formula

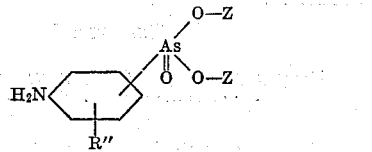

wherein R'' has the above-given meaning, and Z represents a member of the class consisting of hydrogen and alkali metals, and treating the resulting compound with an agent capable of reducing pentavalent to trivalent arsenic. When a nitrophenyl-sulfonyl halide reactant is used, the corresponding nitro compound is obtained; and these nitro compounds may be converted into the corresponding amino compounds by reduction or catalytic hydrogenation, which reduction may be effected concurrently with reduction of pentavalent to trivalent arsenic compounds. When an acylamino-phenyl-sulfonyl halide reactant is used, the corresponding acylamino compound is obtained, which may be converted into the corresponding amino compound by hydrolysis.

The compounds of the main general formula form salts with organic bases (e. g., ethylene diamine) and inorganic bases, particularly with alkalies, i. e., the alkali-metal (including ammonium) and alkaline-earth-metal bases, e. g., calcium hydroxide; and those compounds of the main general formula wherein R is amino form water-soluble acid-addition salts with hydrochloric, sulfuric, nitric, and other acids commonly used to solubilize amine bases.

The salt-type derivatives (B) also comprise compounds wherein R is amino, a hydrogen of which is replaced by a salified group, inter alia:

(I)  —CO—(CH$_2$)$_n$—COO—(alkali metal)

where $n$ is an integer from 2 to 5

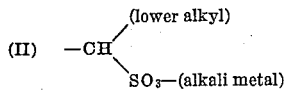

(III)  —alkylene—SO$_2$—(alkali metal)

Compounds embodying Group I may be obtained by reacting a compound of the main general formula, wherein R is the amino group, with the appropriate aliphatic dicarboxylic acid anhydride (especially succinic anhydride), and converting the resulting amino-acid (especially succinamic acid) into the corresponding alkali-metal salt; compounds embodying Group II may be obtained by interacting a compound of the main general formula wherein R is amino with an alkali-metal bisulfite and a lower aliphatic aldehyde, in the manner detailed in U. S. Patent No. 2,214,527, dated September 10, 1940; and compounds embodying Group III may be obtained by reacting a compound of the main general formula wherein R is amino with an alkali-metal aldehyde-sulfoxylate (especially sodium formaldehyde sulfoxylate) in a suitable solvent (e. g., glacial acetic acid). Compounds of the main general formula wherein X is

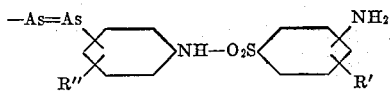

are, of course, capable of forming salt-type derivatives in which a hydrogen of one or both of the amino groups is replaced by a salified group.

The following examples are illustrative of the invention:

EXAMPLE 1

*Preparation of 4,4'-di(p-amino-phenyl-sulfonamido)-arsenobenzene*

11.88 g. sodium hydroxide is dissolved in 60 cc. water, and the solution is cooled and added with agitation to a suspension of 46.5 g. N-sulfanilyl-arsanilic acid (conveniently obtained by the modified-Schotten-Baumann reaction commonly employed in the preparation of N-sulfanilyl derivatives of amino compounds) in 588 cc. water, thus forming a clear solution of sodium N-sulfanilyl-arsanilate.

64.5 g. magnesium chloride is dissolved in 2664 cc. water, and 240 g. sodium hydrosulfite is sprinkled into this solution with agitation, a clear solution being formed. The solution of sodium N-sulfanilyl arsanilate is then added with agitation to this solution; and, when the addition is complete, the reaction mixture is filtered, and then heated to 50–60° C. and maintained at that temperature for two hours. The resulting yellow precipitate of 4,4'-di(p-amino-phenyl-sulfonamido)-arsenobenzene is filtered off, washed free of sulfite, and dried in a vacuum.

EXAMPLE 2

*Preparation of 4,4'-di(3-amino-4-methoxy-phenyl-sulfonamido)-arsenobenzene*

337 g. (1 mol) of sodium arsanilate pentahydrate, NH$_2$C$_6$H$_4$AsO$_3$Na$_2$·5H$_2$O, is dissolved in 1500 cc. water, the solution is mixed with a solution of 503 g. 3-nitro-4-methoxy-phenyl-sulfonyl chloride (2 mols) in 150 cc. ether, and the mixture is stirred for a half hour. Then, while agitating and applying external cooling, 600 cc. of 5-normal sodium hydroxide solution is gradually added in a small stream. When a clear solution forms, the ether layer is removed, and the alkaline solution is acidified, precipitating 4-(3'-nitro-4'-methoxy-phenyl-sulfonamido)-arsanilic acid. The product is then purified by redissolving it in dilute sodium hydroxide solution, and reprecipitating by adding an amount of dilute hydrochloric acid, avoiding an excess which would cause precipitation of 3-nitro-4-methoxy-phenyl-sulfonic acid.

The 4-(3'-nitro-4'-methoxy-phenyl-sulfonamido)-arsanilic acid is then converted into 4,4'-di(3-amino-4-methoxy-phenyl-sulfonamido)-arsenobenzene by reduction in the manner detailed in Example 1 for the reduction of N-sulfanilyl-arsanilic acid, using twice the proportion of sodium hydrosulfite employed in Example 1 in order to reduce both the pentavalent arsenic to trivalent arsenic and the nitro to amino.

EXAMPLE 3

*Preparation of 4,4'-di(3-amino-4-hydroxy-phenyl-sulfonamido)-arsenobenzene*

This compound is obtained by substituting 2 mols of 3-nitro-4-hydroxy-phenyl-sulfonyl chloride for the 2 mols of 3-nitro-4-methoxy-phenyl-sulfonyl chloride in the procedure of Example 2.

EXAMPLE 4

*Preparation of 3,3'-di(p-amino-phenyl-sulfonamido)-4,4'-dihydroxy-arsenobenzene*

(a) 53 g. (0.14 mol) of arsphenamine is suspended in 150 cc. pyridine under a nitrogen atmosphere, and 67.2 g. (0.2 mol) of p-acetaminophenyl-sulfonyl chloride is dissolved in 100 cc. pyridine, while cooling. The solution of the sulfonyl chloride is then added dropwise to the arsphenamine solution, while cooling and under a nitrogen atmosphere, and the reaction mixture is allowed to come to room temperature. Heat is gradually evolved, and a deep red solution is formed in two hours, during which time the reaction mixture is maintained under a nitrogen atmosphere. Then a large excess of dilute hydrochloric acid is added, precipitating 3,3'-di(p-acetamino-phenyl-sulfonamido)-4,4'-dihydroxy-arsenobenzene as a pink crystalline material which is separated by filtration.

(b) 200 g. of the wet 3,3'-di(p-acetaminophenyl-sulfonamido)-4,4'-dihydroxy-arsenobenzene is added to a mixture of 125 cc. of 10% hydrochloric acid and 100 cc. alcohol, and the resulting clear solution is refluxed for one and a half hours. The alcohol is then removed by distillation, and the remaining solution is treated with 20% hydrochloric acid to precipitate the hydrochloride of 3,3'-di(p-amino-phenyl-sulfonamido)-4,4'-dihydroxy-arsenobenzene. This salt is dissolved in water, sodium bisulfite is added to the solution to prevent oxidation, and the solution is neutralized with sodium acetate; the resulting precipitate, 3,3'-di(p-amino-phenyl-sulfonamido)-4,4'-dihydroxy-arsenobenzene, is centrifuged, washed with water, and dried. The entire hydrolysis procedure is carried out under a nitrogen atmosphere.

(b-1) Alternatively, the 3,3'-di(p-acetaminophenyl-sulfonamido)-4,4'-dihydroxy-arsenobenzene may be hydrolyzed by adding 200 g. of the wet compound to a mixture of 1000 cc. 10% hydrochloric acid and 500 cc. alcohol, and refluxing the resulting clear solution for about two hours. The alcohol is then removed by distillation, and the product, 3,3'-di(p-amino-phenyl-sulfonamido)-4,4'-dihydroxy-arsenobenzene, is precipitated by neutralizing the solution with dilute sodium hydroxide solution, and may be purified by converting it into the hydrochloride, and treating the salt as described in Section b.

EXAMPLE 5

*Alternative preparation of 3,3'-di(p-amino-phenyl-sulfonamido) 4,4'-dihydroxy-arsenobenzene* p-Nitro-phenyl-sulfonyl chloride is reacted with arsphenamine in pyridine (cf. Example 4) to obtain 3,3'-di(p-nitro-phenyl-sulfonamido)-4,4'-dihydroxy-arsenobenzene, and the nitro compound is reduced to the corresponding amino compound in the conventional manner, inter alia, by means of sodium hydrosulfite or ammonium sulfide.

EXAMPLE 6

*Preparation of 4-(p-amino-phenyl-sulfonamido)-phenyl-arsenoxide*

6 g. N-sulfanilyl-arsanilic acid is dissolved in 35 cc. 2% sodium hydroxide solution, 25 cc. concentrated hydrochloric acid is added, and the precipitate is redissolved by the addition of about 200 cc. water. 3 g. potassium iodide in 10 cc. water is added to this solution, resulting in a deep orange color, and then 100 cc. of 40% sodium bisulfite solution is added in small increments at intervals of about 10 minutes, during which addition the color of free iodine disappears, the solution becomes orange-colored, and 4-(p-amino-phenyl-sulfonamido)-phenyl-arsenoxide separates as an orange precipitate. After all the sodium bisulfite solution has been added, the precipitate is removed by filtration, washed three times with 5% sodium bicarbonate to dissolve any unreacted N-sulfanilyl-arsanilic acid, and dried at room temperature in vacuo.

EXAMPLE 7

*Preparation of salts of 4,4'-di(p-amino-phenyl-sulfonamido)-arsenobenzene*

(a) 4,4'-di(p-amino-phenyl-sulfonamido)-arsenobenzene readily dissolves in dilute sodium hydroxide solution, providing an aqueous solution of the sodium salt of the arsenical; and the sodium salt may be isolated in the conventional manner, e. g., by evaporating the water (under vacuum).

(b) The hydrochloride of 4,4'-di(p-aminophenyl-sulfonamido)-arsenobenzene is obtained by dissolving the compound in water, adding a large excess of concentrated hydrochloric acid, whereupon the salt precipitates, and drying the precipitate under a high vacuum until it no longer retains any excess HCl. An aqueous solution of the salt may be prepared without isolating the salt, by adding the compound to a dilute aqueous solution of hydrochloric acid.

EXAMPLE 8

*Preparation of salt-type derivatives of 4-(p-amino-phenyl-sulfonamido)-phenyl-arsenoxide*

(a) The sodium salt of 4-[p-α-sulfo-ethylamino)-phenyl-sulfonamido]-phenyl-arsenoxide is obtained from sodium bisulfite, acetaldehyde, and 4-(p-amino-phenyl-sulfonamido)-phenyl-arsenoxide by the procedure described in U. S. Patent 2,214,527 for the production of the corresponding salt-type derivative of sulfanilamide.

(b) The sodium formaldehyde sulfoxylate derivative of 4-(p-amino-phenyl-sulfonamido)-phenyl-arsenoxide is obtained as follows: A mixture of equivalent amounts of sodium formaldehyde sulfoxylate and 4-(p-amino-phenyl-sulfonamido)-phenyl-arsenoxide is added with stirring to glacial acetic acid. When a clear solution is formed, ether is added until a solid precipitate forms; this is filtered off, washed with ether, and dissolved in a small amount of water, and the solution is neutralized with sodium bicarbonate. On addition of alcohol and cooling, the inorganic salts precipitate out and are removed by filtration. Ether is then added to the filtrate, and the crystalline precipitate formed (the desired salt) is filtered off, washed, dried, and purified by recrystallization from 50% alcohol.

(b-1) Alternatively, the sodium formaldehyde sulfoxylate derivative of 4-(p-amino-phenyl-sulfonamido)-phenyl-arsenoxide may be obtained by interacting equivalent amounts of sodium formaldehyde sulfoxylate and 4-(p-amino-phenyl-sulfonamido)-phenyl-arsenoxide in water, filtering the solution, and concentrating in vacuum.

(c) The sodium salt of the succinic acid derivative of 4-(p-amino-phenyl-sulfonamido)-phenyl-arsenoxide is obtained by fusing equivalent amounts of succinic anhydride and 4-(p-amino-phenyl-sulfonamido)-phenyl-arsenoxide, dissolving the mixture in water containing an equivalent amount of sodium hydroxide, filtering, and drying in vacuum.

Manifestly, a large number and variety of other compounds of the main general formula (A) and of salt-type derivatives of such compounds (B) may be obtained by the procedure of the foregoing examples, using the corresponding reactants. The following additional compounds, inter alia, are thus obtainable:

3-(p-amino-phenyl-sulfonamido)-4-hydroxy-phenyl-arsenoxide 3-(p-amino-phenyl-sulfonamido)-4-hydroxy-phenyldichloro-arsine 4,4'-di(p-acetamino-phenyl-sulfonamido)-arsenobenzene 4,4'-di(p-nitro-phenyl-sulfonamido)-arsenobenzene The di-sodium salt of 4,4'-di[p-(α-sulfo-ethylamino)-phenyl-sulfonamido]-arsenobenzene The di-hydrochloride of 4,4'-di(3-amino-4-methoxy-phenyl-sulfonamido)-arsenobenzene The di-(sodium formaldehyde sulfoxylate) derivative of 3,3'-di(p-amino-phenyl-sulfonamido)-4,4'-dihydroxy-arsenobenzene The calcium salt of 4-(p-amino-phenyl-sulfonamido)-phenyl-arsenoxide 3-(p-amino-phenyl-sulfonamido)-4-hydroxy-phenyl-arsenoxide hydrochloride The sodium salt of 3-(p-amino-phenyl-sulfonamido)-4-hydroxy-phenyldichloro-arsine Among other reactants which may be employed in place of their equivalents in the procedure of the foregoing examples are:

p-Methylamino-phenyl-sulfonyl chloride
p-Diethylamino-benzene-sulfonyl chloride
m-Nitro-phenyl-sulfonyl chloride
3-amino-4-hydroxy-phenyldibromo-arsine The invention may be variously otherwise embodied within the scope of the appended claims.

We claim:

1. A compound of the general formula

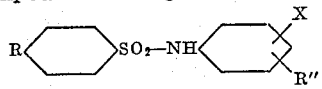

wherein X represents a member of the class consisting of —As=O, —As (halogen)$_2$, and

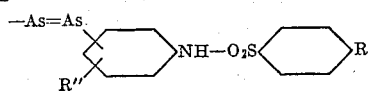

R represents a member of the class consisting of

nitro-, amino, (lower alkyl)-amino, and acylamino, and R'' represents a member of the class consisting of hydrogen and hydroxy.

2. 4,4'-di(p-amino-phenyl-sulfonamido)-arsenobenzene.

3. 4-(p-amino-phenyl-sulfonamido)-phenyl-arsenoxide.

4. A compound of the general formula

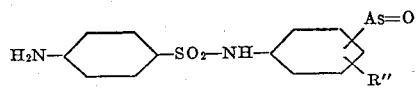

wherein R'' represents a member of the class consisting of hydrogen and hydroxy.

5. A compound of the general formula

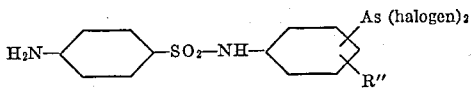

wherein R'' represents a member of the class consisting of hydrogen and hydroxy.

6. A compound of the general formula

wherein R'' represents a member of the class consisting of hydrogen and hydroxy.

WILLIAM A. LOTT.
RAYMOND VAN WINKLE.